US008363625B2

United States Patent
Yeo et al.

(10) Patent No.: US 8,363,625 B2
(45) Date of Patent: Jan. 29, 2013

(54) METHOD FOR REQUESTING RESOURCE AND SCHEDULING FOR UPLINK TRAFFIC IN MOBILE COMMUNICATION AND APPARATUS THEREOF

(75) Inventors: Geon-Min Yeo, Daejeon (KR); Byung-Han Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1374 days.

(21) Appl. No.: 11/991,008

(22) PCT Filed: Aug. 25, 2006

(86) PCT No.: PCT/KR2006/003361
§ 371 (c)(1),
(2), (4) Date: Feb. 26, 2008

(87) PCT Pub. No.: WO2007/024120
PCT Pub. Date: Mar. 1, 2007

(65) Prior Publication Data
US 2009/0252124 A1  Oct. 8, 2009

(30) Foreign Application Priority Data
Aug. 26, 2005  (KR) .................. 10-2005-0078991

(51) Int. Cl.
*H04J 3/00*  (2006.01)
(52) U.S. Cl. .................. 370/336; 370/310.2; 370/337; 370/412
(58) Field of Classification Search .................. 370/328, 370/342, 443
See application file for complete search history.

(56) References Cited

U.S. PATENT DOCUMENTS

| | | | |
|---|---|---|---|
| 2001/0038620 A1* | 11/2001 | Stanwood et al. | 370/336 |
| 2002/0172217 A1* | 11/2002 | Kadaba et al. | 370/443 |
| 2003/0103525 A1* | 6/2003 | Wahl | 370/465 |
| 2004/0013089 A1* | 1/2004 | Taneja et al. | 370/235 |
| 2004/0186877 A1* | 9/2004 | Wang et al. | 709/200 |
| 2005/0073985 A1* | 4/2005 | Heo et al. | 370/342 |
| 2005/0078651 A1 | 4/2005 | Lee et al. | |
| 2005/0105553 A1 | 5/2005 | Zhang et al. | |
| 2005/0135295 A1* | 6/2005 | Walton et al. | 370/328 |
| 2006/0034219 A1* | 2/2006 | Gu et al. | 370/329 |
| 2006/0227796 A1* | 10/2006 | Wei et al. | 370/412 |

OTHER PUBLICATIONS

ETRI, "Resource request and UL scheduling for evolved UTRA", 3GPP TSG-RAN WG2 LTE, R2-051876, 4 pages, Aug. 31, 2005.
Jeong-Seok Heo et al., "Resource Allocation Protocol Based on Maximum Cell Transfer Delay for RT-VBR Services in Wireless ATM LAN", Proceedings of the 7th Korea-Russia International Symposium, KORUS 2003, pp. 166-172.
International Search Report (PCT/ISA/210) mailed Nov. 20, 2006 in connection with the International Application PCT/KR2006/003361.

* cited by examiner

*Primary Examiner* — Dang Ton
*Assistant Examiner* — Pamit Kaur
(74) *Attorney, Agent, or Firm* — Staas & Halsey LLP (57) ABSTRACT

The present invention relates to a resource request and a packet scheduling method for uplink traffic in a mobile communication system. For efficient scheduling of the uplink traffic, a base station and user equipment (UE) determines a scheduling method according to characteristics of the traffic when performing negotiation therebetween. The traffic may be classified into traffic that generating a fixed-size packet in a periodical time interval, traffic that generates a variable-size packet in a periodic time interval, and traffic that generates a variable-size packet in a random time interval. Therefore, the UE requests a resource in accordance with the characteristics of the traffic and the base station performs scheduling according to the characteristics of the traffic such that an optimal uplink packet scheduling can be achieved.

13 Claims, 10 Drawing Sheets

METHOD FOR REQUESTING RESOURCE AND SCHEDULING FOR UPLINK TRAFFIC IN MOBILE COMMUNICATION AND APPARATUS THEREOF

CROSS REFERENCE TO RELATED APPLICATIONS

This application claims the benefit under 35 U.S.C. Section 371, of PCT International Application Number PCT/KR2006/003361, filed Aug. 25, 2006 and Korean Application No. 10-2005-0078991 filed Aug. 26, 2005 in Korea, the contents of all of which are incorporated herein by reference.

TECHNICAL FIELD

The present invention relates to a scheduling method of a mobile communication system, and more particularly, relates to a method for requesting resources for uplink traffic and packet scheduling, and an apparatus using the same.

BACKGROUND ART

Recently, a standard protocol and a system for wireless Internet service have been actively developed, and accordingly, the importance of a packet transmission technique has been highlighted for preempting technical power in a packet-based fourth generation mobile communication system.

A resource allocation request and link packet scheduling methods for satisfying quality of service (QoS) requirements and maximizing wireless link efficiency in packet transmission packet is a specialized field of wireless link sharing, and is valued as an important resource for improving system capacity compared to a conventional wired system.

A resource request includes a series of processes in which user equipment (UE) informs the presence of uplink data to a base station and requests a necessary amount of resource allocation. A scheduling method of which the base station allocates resources to the UE can be divided into an uplink scheduling method and a downlink scheduling method.

According to the downlink scheduling method, the base station allocates resources while checking the amount of data packets stored in a transmit buffer of the base station in real-time. According to the uplink scheduling method, the base station allocates resources on the basis of buffer state information reported from the terminal. Therefore, an efficient resource request method is required for maximizing radio resource utilization and providing quality of service (QoS) in the uplink scheduling method. In order to realize the efficient resource request method, a transmit buffer state should be reported at an appropriate time and in an appropriate level of contents.

Appropriateness in the reporting time indicates that the UE should report the transmit buffer state information in an appropriate time so as to guarantee QoS. For example, when the amount of data packets queued in the transmit buffer is increasing and the UE does not report the transmit buffer state, data is transmitted through subsequently allocated uplink resources. However, in this case, the resources through which the data is transmitted is allocated without considering the state of the transmit buffer. Therefore, with respect to a network, the data does not satisfy delay requirements. As a result, the data successfully transmitted from a transmitting side may be discarded in a receiving side. Meanwhile, uplink packet scheduling performance may be improved as the number of reports on the state of the transmit buffer of the UE increases. However, excessive resource use may cause a trade-off.

The appropriateness in the reporting time has a close relationship to a time interval from the time that the UE determines a resource request to the time that the base station perceives the request. As the time that the base station perceives the resource request of the UE is delayed, the time interval is increased, thereby decreasing utility of transmitted data. The delay is closely related to design of frame and channel structures.

The appropriate level of reporting contents indicates that information provided by the UE should include appropriate information for efficient uplink scheduling of differentiated multimedia services. For example, in the case of a file transfer protocol (FTP) that is insensitive to time delay compared to other services, information on the amount of packets queued in the transmit buffer is more worthy than information on a packet that has been transmitted to the transmit buffer for the first time (so-called a head of line, HOL). Therefore, since unnecessary and unimportant information is inappropriate with respect to utilization of radio resources, the reporting contents should include information for efficient scheduling.

As described, information on the transmit buffer state reported to the base station from the UE for uplink scheduling may be called scheduling information, and the scheduling information must include optimum information for efficient scheduling. The uplink scheduling is performed on the basis of the scheduling information and QoS information exchanged between the UE and the base station when establishing a connection therebetween. The QoS information is an index that should be satisfied on average or ultimately, and the scheduling information is a measure that indicates short-term service satisfaction of a user. Therefore, optimum uplink scheduling can be achieved when the QoS information and the scheduling information are converged to each other. Since the QoS information and the scheduling information vary depending on characteristics of traffic between the UE and the base station, a resource request method and a scheduling method that provide efficient scheduling information according to characteristics of traffic are required in order to achieve optimum uplink scheduling.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a resource request and packet scheduling method that can guarantee QoS according to characteristics of various uplink traffic in a packet-based mobile communication system.

Technical Solution

An exemplary packet scheduling method according to one embodiment of the present invention is provided for uplink traffic transmission from user equipment (UE) to a base station in a mobile communication system. The packet scheduling method includes a) negotiating with the UE and setting information that includes a resource allocation start time, by the base station; b) determining whether the resource allocation start time that has been set during the negotiation has passed, by the base station; and c) when the resource allocation start time has passed, performing scheduling for the UE by using a scheduling method that is predetermined in accordance with characteristics of traffic to be transmitted on the basis of scheduling information from the UE, by the base station.

Herein, the traffic may correspond to one of traffic that generates a fixed-size packet in a periodic time interval and traffic that generates a variable-size packet in a random time interval.

Particularly, when a predetermined scheduling method is determined in accordance with the traffic, c) may include transmitting a resource allocation query for a resource request to the UE with a time interval negotiated with the UE from the resource allocation start time, receiving query response information from the UE according to the transmission of the query, updating scheduling information of the UE based on the query response information, and performing scheduling for the UE based on the scheduling information.

In this case, the query response information may indicate that a transmit buffer of the UE is empty. In addition, the query response information may include buffer occupancy (BO) based on packet data stored in a transmit buffer of the UE and head of line (HOL) delay time of a first packet data in the transmit buffer.

An exemplary resource request method according to another embodiment of the present invention is provided for UE to request resource allocation from a base station for uplink traffic transmission in a mobile communication system. The resource request method includes a) receiving a query for allocating a resource for a resource request from the base station; b) determining a state of a transmit buffer in the UE according to the query; c) when the transmit buffer is empty, generating scheduling information indicating that the transmit buffer is empty; d) when there is packet data queued in the transmit buffer, generating scheduling information that includes HOL delay time of a first packet data in the transmit buffer and BO of the transmit buffer; and e) requesting a resource by transmitting the generated scheduling information to the base station.

An exemplary packet scheduling apparatus according to another embodiment of the present invention is provided for transmitting uplink traffic from UE to a base station in a mobile communication system. The packet scheduling apparatus includes a first scheduler, a second scheduler, a third scheduler, a fourth scheduler, and a storing unit. The first scheduler allocates a fixed-size resource in a periodic time interval. The second scheduler allocates a variable-size resource in a periodic time interval. The third scheduler allocates a resource for a resource request in a periodic time interval. The fourth scheduler allocates a resource on the basis of a message provided from the UE using random access. The storing unit stores scheduling information of the UE. One of the first to fourth schedulers performs scheduling for the UE based on the scheduling information stored in the storing unit in accordance with characteristics of the traffic.

Advantageous Effects

According to the exemplary embodiment of the present invention, resource allocation that can guarantee QoS according to characteristics of various uplink traffic can be achieved in a packet-based mobile communication system.

In addition, the UE allocates resources by using a method according to traffic characteristics, and the base station performs scheduling according to the traffic characteristics, thereby achieving optimum uplink packet scheduling.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, throughout this specification and the claims which follow, unless explicitly described to the contrary, the word "comprise" and variations such as "comprises" or "comprising" will be understood to imply the inclusion of stated elements but not the exclusion of any other elements.

In addition, throughout this specification and the claims which follow, a module means a unit that performs a specific function or operation, and can be realized by hardware of software, or a combination of both.

Figure 1:
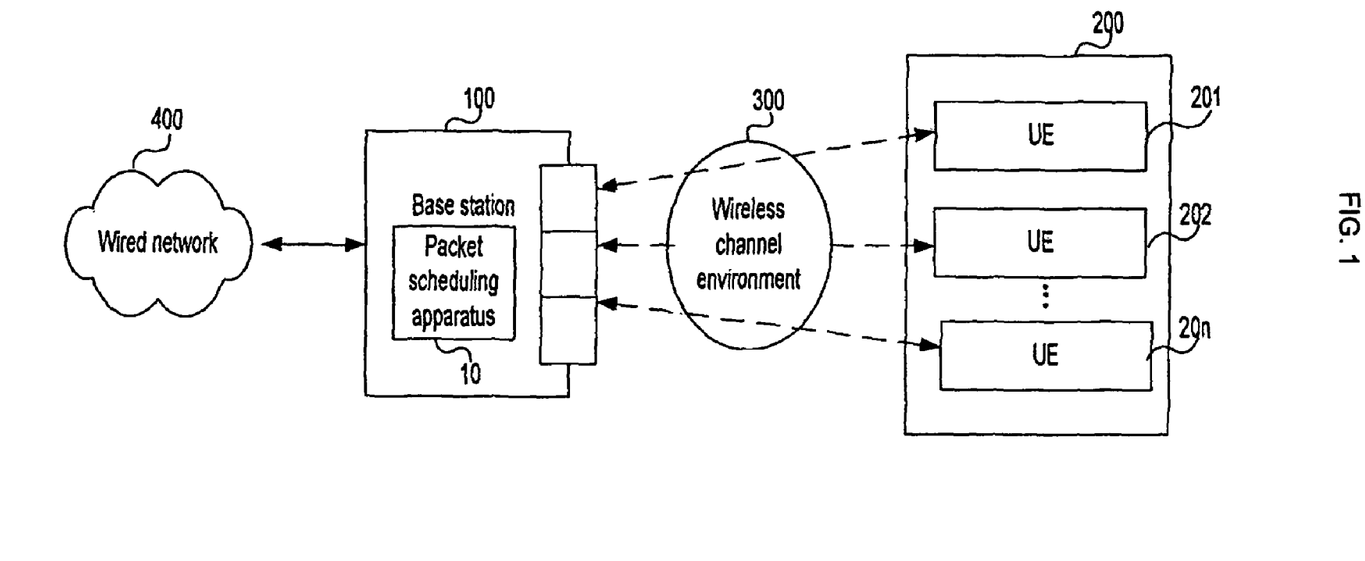
FIG. 1 is a configuration diagram of a mobile communication system according to an exemplary embodiment of the present invention.

FIG. 1 is a configuration diagram of a mobile communication system according to an exemplary embodiment of the present inventions.

As shown in FIG. 1, in the mobile communication system according to the exemplary embodiment of the present invention, a base station 100 communicates data with a plurality of UEs 201 to 20$n$ (where n is a positive integer) through a wireless channel environment 300. In the present embodiment, a notational number of the UEs will be 200 for ease of description.

The UE 200 includes a transmit buffer (not shown) for storing uplink traffic data. The transmit buffer temporarily stores packet data to be transmitted to the base station 100, and the packet data is converted to a packet frame in a physical layer and then transmitted to the base station 100. Since the amount of packet traffic varies with respect to time, the transmit buffer status is also time-varying. Therefore, the transmit buffer status must be reported to the base station 100 for efficient resource management.

For this purpose the UE 200 transmits scheduling information to the base station 100. The scheduling information includes all information that the UE 200 provides to the base station 100 for scheduling, the information including the number of packet data, the amount of packet data, head-of-line (HOL) delay time, buffer occupancy (BO), and so on.

The amount of packet data indicates total bytes of the packet data. In the case that a predetermined byte forms a basic transmission unit, the amount of packet data may indicate the number of basic transmission units. The HOL delay time indicates a time interval between a first packet data input time and a current time, wherein the first packet data indicates packet data input to the transmit buffer for the first time among data packet queued in the transmit buffer. That is, the HOL delay time may indicate the amount of time that the first packet data has been queued in the transmit buffer without being transmitted.

The BO indicates the status of the transmit buffer after data transmission by using resources allocated by a current base station, and more particularly indicates the amount of data remaining in the transmit buffer and the amount of data to be added. Therefore, the BO can be represented by the number of bytes or a default transmission unit of a predetermined number of bytes. The BO may include the number of packet data remaining in the transmit buffer.

The UE 200 converts data packets queued in the transmit buffer to a packet frame in a physical layer. That is, the UE 200 converts a service data unit (SDU) input to a medium access control (MAC) layer from an upper layer into a packet data unit (PDU) and transmits the PDU. The PDU is broadly formed of a header, a payload, and/or a cyclic redundancy check for error detection. The header indicates a destination address to which packet traffic is transmitted and a data type, and the payload stores data and has a varying length depending on the type of packet data. A PDU that does not include a payload is called a "status PDU". The status PDU is not for data transmission but for predetermined information transmission, and may have a fixed length.

The UE 200 may use various methods for transmitting scheduling information to the base station 100. A resource request method for requesting resource allocation by transmitting the scheduling information to the base station 100 may be changed in accordance with a scheduling information transmission method, and can be classified as shown in Table 1.

TABLE 1

| Type | Definition |
|---|---|
| First resource request method | A UE transmits scheduling information through a status PDU to a base station |
| Second resource request method | A UE includes scheduling information in a header of a PDU for data transmission and transmits the PDU to a base station |
| Third resource request method | A UE concatenates scheduling information to a PDU for data transmission and transmits the PDU to a base station |
| Fourth resource request method | A UE transmits scheduling information to a base station by using random access |

The respective resource request methods process the scheduling information to an information element (IE), and transmit the IE to the base station by including the IE to the PDU header, concatenating the IE to the PDU, or processing the IE to the statue PDU. Herein, the IE indicates single information formed of several bits.

The base station 100 communicates data with the UE 200, and, particularly, the base station 100 schedules an uplink channel of the corresponding UE based on scheduling information provided from the UE 200. For this purpose the base station 100 includes a packet scheduling apparatus 10, and provides information for the scheduling to the packet scheduling apparatus by communicating data with at least one UE.

Particularly, when a connection between the base station 100 and the UE 200 is established, the base station 100 negotiates basic functionality with the UE 200, and methods for authorization and other processes are set. At this time, a scheduling method is negotiated, and a scheduling method is selected in accordance with traffic provided in the exemplary embodiment of the present invention. The traffic can be classified as shown in Table 2.

TABLE 2

| Type | Definition |
|---|---|
| PF traffic | Periodic-interval with fixed size |
| PV traffic | Periodic-interval variable size |
| AV traffic | Aperiodic-interval variable size |

The PF traffic, for example, includes voice over service traffic. The PV traffic, for example, includes MPEG video traffic. The AV traffic, for example, includes file transfer protocol (FTP) traffic. The UE may use different resource request methods for the respective uplink traffic according to characteristics of the corresponding traffic.

The types of the respective uplink traffic of the UE are classified in accordance with the classified characteristics in Table 1, and a proper scheduling method is selected from among a plurality of scheduling methods depending on the type of the uplink traffic. A scheduling method according to the exemplary embodiment of the present invention can be classified as shown in Table 3.

TABLE 3

| Type | Definition |
|---|---|
| PF scheduling | Allocate a fixed amount of resources on the basis of periodic time interval |
| PV scheduling | Allocate variable-size resources on the basis of periodic time interval |
| PQ scheduling | Allocate resource for request on the basis of periodic time interval |
| BE scheduling | Allocate resource by using random access of a UE |

However, the base station may automatically determine the type of uplink traffic and set a scheduling method accordingly rather than setting a scheduling method during the negotiation. In this case, the type of traffic can be typically classified on the basis of a traffic header since the traffic header contains information on the type of the traffic.

Figure 2:
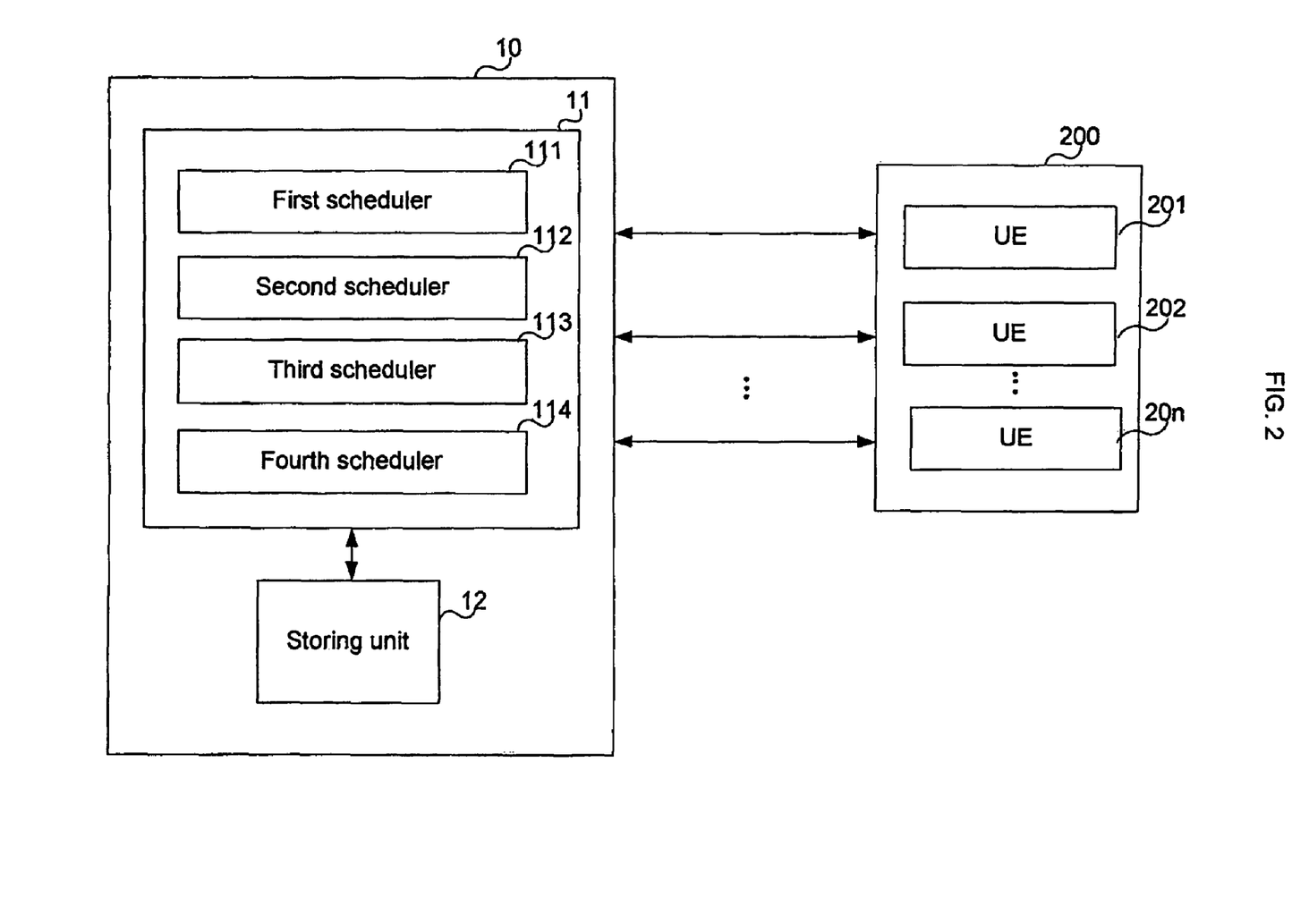
FIG. 2 is a configuration diagram of a packet scheduling apparatus according to the exemplary embodiment of the present invention.

FIG. 2 is a configuration diagram of a packet scheduling apparatus according to an exemplary embodiment of the present invention.

As shown in FIG. 2, the packet scheduling apparatus includes a scheduler 11 and a storing unit 12 for storing scheduling information.

The scheduler 12 schedules a session with the corresponding UE according to a selected scheduling method. Particularly, the scheduler 11 includes a first scheduler 111 to fourth scheduler 114 for performing the respective scheduling methods according to the exemplary embodiment of the present invention.

The first scheduler 111 performs scheduling in accordance with the periodic-interval fixed-size (PF) scheduling method. According to the PF scheduling method, the base station periodically allocates a fixed-size resource to the UE without receiving a resource request from the UE.

The second scheduler 112 performs scheduling in accordance with the periodic-interval variable-size (PV) scheduling method. According to the PV scheduling method, the base station periodically allocates a variable-size resource to the UE.

The third scheduler 113 performs scheduling in according to the periodic query (PQ) scheduling method. According to the PQ scheduling method, the base station allocates an amount of resources to the UE, through which the UE can transmit predetermined information so as to periodically check the amount of data queued to be transmitted in the UE. The UE transmits the specific information through the allocated resources, and the base station performs scheduling based on the information. Particularly, the PQ scheduling method allows random access of the UE. When there is no response from the base station after a predetermined period of time has passed, that is, when the base station does not allocate resources for transmission of SI, the UE requests resource allocation while reporting SI using random access to the base station.

The fourth scheduler 114 performs the BE scheduling method. Basically, the BE scheduling method performs scheduling in accordance with random access of the UE. That is, when the UE reports SI by random access to the base station, the base station performs scheduling on an uplink channel of the UE based on the reported SI.

The storing unit 12 stores SI on a session of UE. Particularly, the storing unit 12 may store scheduling information reported from UE, together with a scheduling method selected for the session. The respective schedulers 111 to 114 perform scheduling on the basis of the scheduling information stored in the storing unit 12, or update the scheduling information stored in the storing unit 12 with scheduling information reported from UE.

The packet scheduler 10 according to the exemplary embodiment of the present invention performs scheduling in accordance with the PF scheduling method when the uplink traffic is PF traffic, performs scheduling in accordance with the PV scheduling method when the uplink traffic is PV traffic, and performs scheduling in accordance with the PQ scheduling method when the uplink traffic is AV traffic. However, this is not restrictive, and the packet scheduler 10 may select a proper scheduling method among a plurality of scheduling methods depending on characteristics of the uplink packet and perform the selected scheduling method. Further, the packet scheduler 10 may select a proper scheduling method based on a resource request method of UE and perform the selected scheduling method.

For convenience of description, it is described that the base station performs scheduling in the following embodiment of the present invention. However, a predetermined scheduler of the packet scheduling apparatus 10 may substantially perform scheduling according to the respective scheduling methods.

A method for requesting resources and packet scheduling for uplink traffic according to an exemplary embodiment of the present invention will now be described.

A method for packet scheduling in accordance with the PV scheduling method will be described first.

According to the PF scheduling method, a base station allocates a resource of a fixed-size (S_a) to the UE with a periodic time interval (T_a). The time interval T_a and the fixed-size S_a are negotiated between the UE and the base station. During this negotiation, a resource allocation start time (T_s) is also negotiated. Processes for establishing a connection between the UE and the base station and negotiation therebetween are well known to those skilled in the art, and therefore a detailed description is omitted.

Figure 3:
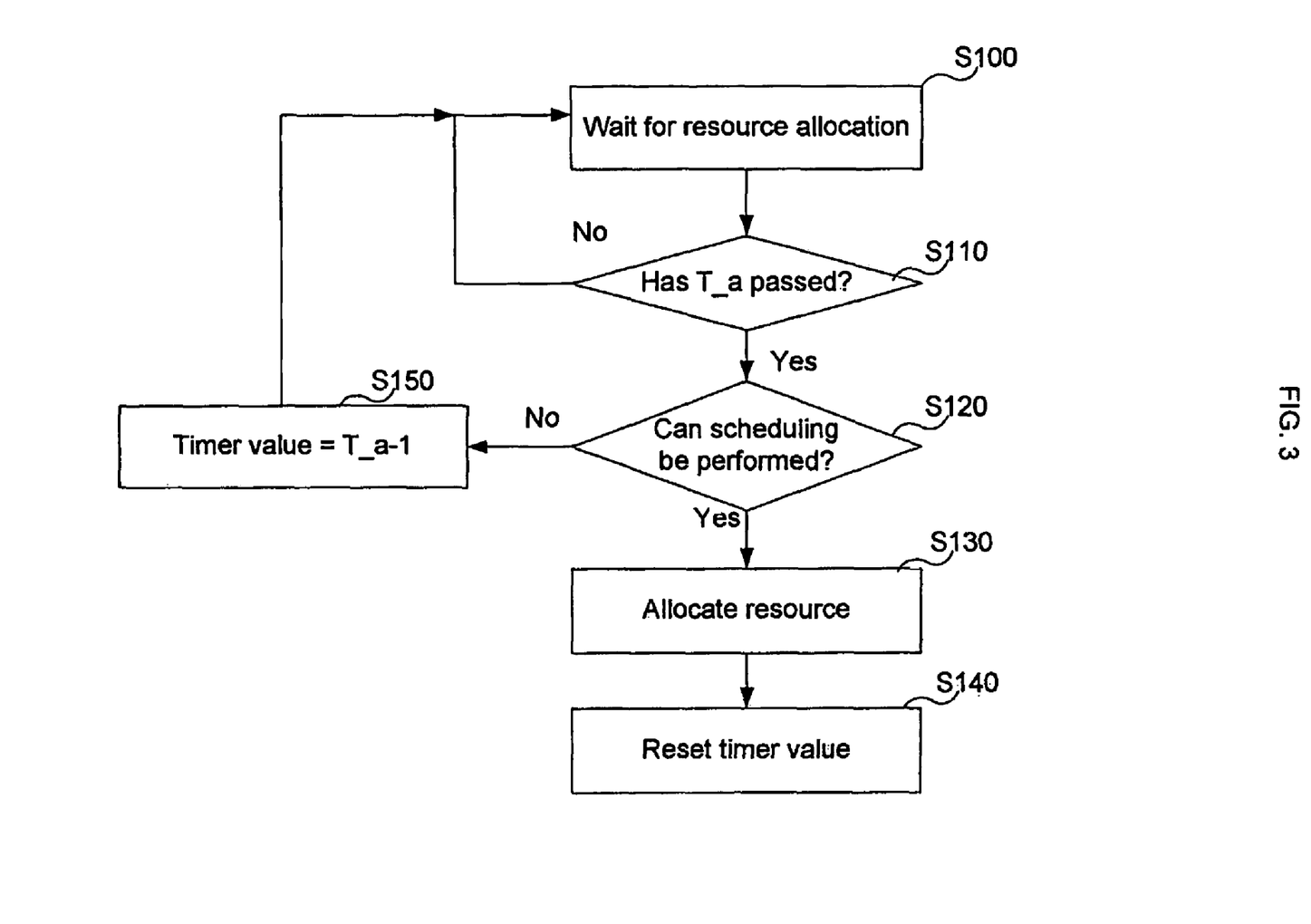
FIG. 3 is an operation flowchart of a base station according to a first exemplary embodiment of the present invention.
Figure 4:
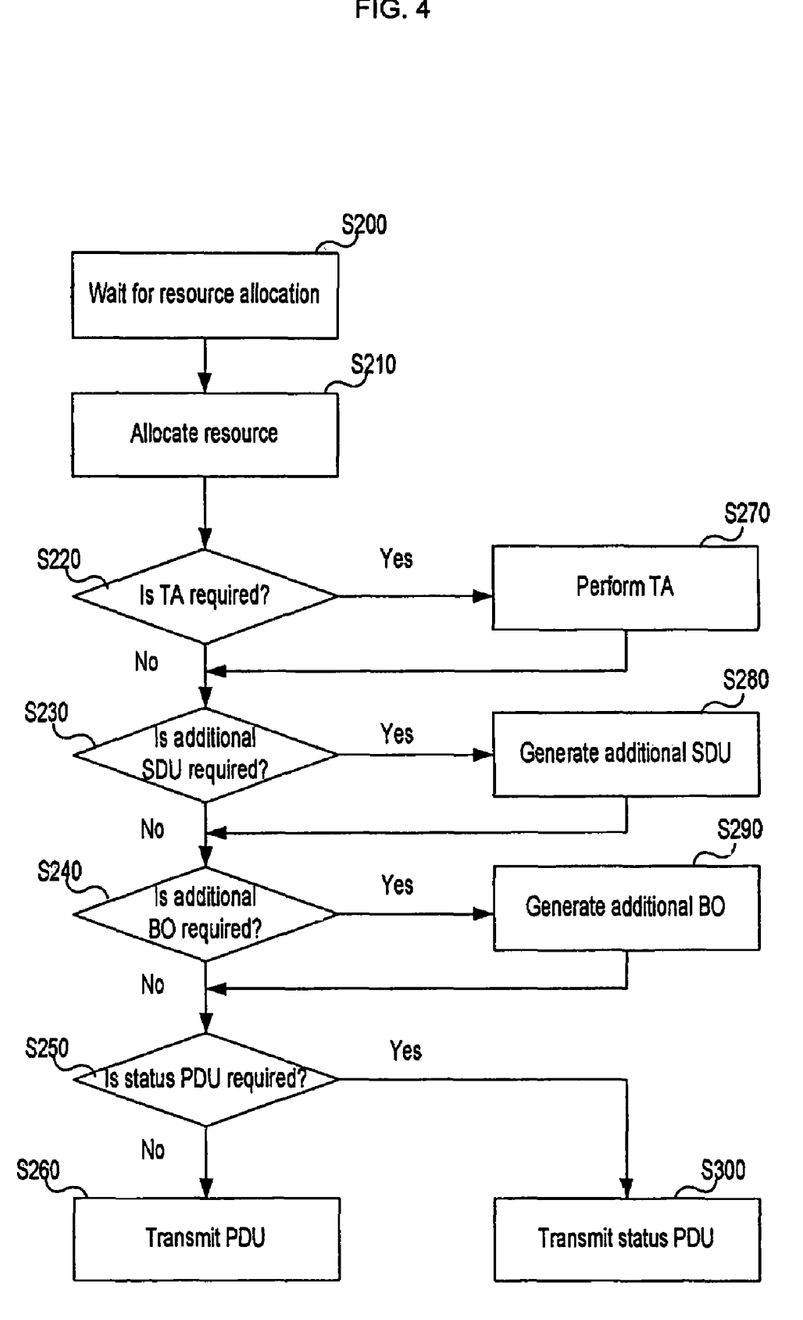
FIG. 4 is an operation flowchart of a UE according to the first exemplary embodiment of the present invention.

FIG. 3 and FIG. 4 respectively show a flowchart of a PF scheduling method according to a first exemplary embodiment of the present invention. Particularly, FIG. 3 is an operation flowchart of a base station, and FIG. 4 is an operation flowchart of UE.

The time interval (T_a), the fixed-size (S_a), and the resource allocation start time (T_s) are set in accordance with the connection establishment and negotiation between the UE and the base station, and the base station performs scheduling for a session with the corresponding UE as shown in FIG. 3.

When a certain amount of time has passed from the end of the negotiation and reaches the resource allocation start time (T_s), the base station 100 allocates a resource of the fixed-size (S_a) to the UE 200. In this case, the resource can be allocated at the resource allocation start time (T_s) or can be allocated after the time interval (T_a) has passed from the resource allocation start time (T_s). In the present embodiment, the resource is allocated after the time interval (T_a) has passed from the resource allocation start time (T_s), but this is not restrictive.

The base station 100 counts time from the resource allocation start time (T_s) by using a timer, and allocates a fixed-size resource to the UE 200 when the counted time corresponds to the predetermined time interval (T_a). In more detail, after a timer value is set to the negotiated time interval (T_a), the timer value (T_a) is decremented as time passes in step S100. The time value (T_a) is decremented by each slot unit or frame unit, and it is regarded that a predetermined time has passed when the timer value (T_a) corresponds to zero, in steps S110 and S120. Herein, an event in which the timer value T_a corresponds to zero is called "a T_a timeout", for convenience of description.

When the T_a timeout is triggered, the UE is allocated with the fixed-size (T_a) resource and the timer is reset, in steps S130 and 140. Herein, the reset of the timer implies that the timer value is restored to the negotiated time interval T_a. Therefore, when the T_a timeout is triggered, the timer value is reset to T_a and resources are allocated with the time interval in a manner like the above.

However, when the T_a timeout is triggered, resource allocation may be impaired due to inefficient radio resources. In this case, scheduling may not be performed, and therefore a timer value for resource allocation for the corresponding session is set lower than T_a rather than being restored to T_a such that the session can have priority to other sessions in resource allocation, in step S150. For example, the timer value is set to have a negative value by setting the timer value to T_a−1. Therefore, the session having the negative timer value has priority to other session having a positive timer value in subsequent resource allocation.

On the other hand, resource allocation can be performed for efficiency in use of resources or when UE has a good channel quality of resources even though the T_a timeout is not triggered. In this case, a timer value does not need to be reset to T_a even though the resource allocation is performed. In more detail, resources allocated before resetting the timer value to T_a may be prepared for the case that packets having been transmitted before the allocation of the resources cannot be allocated with sufficient resources. Accordingly, packets can be transmitted in a regular time interval even though the resource allocation is performed before T_a. When T_a is reset in this case, a resource allocation interval may be shifted, resulting in a regular delay between packet generation and resource allocation. Therefore, T_a may not be reset in order to prevent the delay.

When the base station performs PF scheduling as described above, the UE requests resources while being operated as follows.

FIG. 4 is an operation flowchart of UE according to the first exemplary embodiment of the present invention.

After negotiation, the UE 200 waits for resource allocation of the base station. When the base station allocates the fixed-size (S_a) resource through the above-described process after a predetermined time has passed in step S200 and S210, the UE 200 processes data (SDUs) queued in the transmit buffer to PDUs and transmits the PDUs to the base station 100 through the allocated resources.

In more detail, as shown in FIG. 4, after resources are allocated, the UE 200 transmits the PDUs to the base station 100 through the allocated resources in step S260 in the case that there is no need of transmitting a status PDU since resource allocation timing adjustment (TA) is not requested, an additional SDU is not required, nor is additional BO required, in steps S220 to S250.

Meanwhile, the UE generates the status PDU and transmits the same to the base station 100 1) when the resource allocation start time (T_s) needs to be changed, 2) when there is an additional SDU to be transmitted, or 3) when additional BO needs to be reported for real-time transport control protocol (RTCP) packet transmission in addition to the additional SDU.

Herein, the resource allocation start time (T_s) needs to be changed when timing between a traffic source and a MAC becomes instantaneously irregular and thus the current resource allocation start time causes delay. In this case, the UE takes a principal role in the change of the resource allocation start time in step S270. As described, resource allocation start time adjustment performed by UE is called TA in the present embodiment. After that, a status PDU that contains the changed resource allocation start time is generated and transmitted to the base station 100.

The additional SDU that is not transmitted is generated a) when a base station intentionally does not allocate resources at a predetermined time for efficient resource management or when radio resources are insufficient, b) when the base station allocates resources but the UE cannot decrypt resource allocation information of the base station, or c) when the UE transmits PDUs through the allocated resource but the base station cannot decrypt the PDUs.

In the case of a), since the base station intentionally does not allocate the resources even though the base station is aware of scheduling information on the UE, the base station is aware of the state of the transmit buffer of the UE (e.g., the number of SDUs queued to be transmitted in the UE). However, in the cases of b) and c), the base station does not know the state of the transmit buffer of the UE. Therefore, a process for reporting the number of additional SDUs that need to be transmitted is required so as for the base station to be aware of the state of the transmit buffer of the UE. In this case, the UE 200 generates a status PDU that contains the number of additional SDUs and transmits the status PDU to the base station 100 in step S280.

The additional BO report for RTCP packet transmission is required for efficient scheduling. In general, a VoIP packet classified into the PF traffic uses a real time transport protocol (RTP) as an uplink transmission protocol. That is, a traffic packet is transmitted with an RTP/UDP/IP packet. Control information on the corresponding connection is generated during traffic transmission, and is transmitted by using the RTCP. When transmitting an RTCP stream that corresponds to the control information, it may be understood as another connection. However, it is more efficient to transmit the RTCP stream along with a RTP stream that transmits traffic packets. Therefore, the UE 200 generates information on BO for transmission of an RTCP packet that corresponds to control information that is input when transmitting a VoIP packet in step S290, and reports the information to the base station 100. This is efficient for resource allocation and scheduling.

As described above, when the UE 200 needs to report for the above three cases (1) to (3), the UE 200 includes the corresponding information in a status PDU according to the first resource request method and transmits the status PDU to the base station 100, in step S300. The status PDU contains only predetermined information, and does not contain data.

However, since the base station typically allocates a resource that is just enough for transmission of only one SDU, the allocated resource may not have space for transmitting the status PDU. In this case, the UE 200 transmits the status PDU first when one of the cases 1) to 3) has occurred so as to report the state of the UE 200, and transmits SDUs queued in the transmit buffer through subsequently allocated resources. The UE 200 may acquire information element (IE) in a MAC header for reporting the state of UE 200, and include the information on the UE 200 in the IE according to the second resource request method. Therefore, the state information may be included in a header of a PDU that transmits an SDU. On the other hand, in the case that there is enough space in the resource allocated to the UE 200, the state PDU may be combined to the PDU according to the third resource request method.

Figure 5:
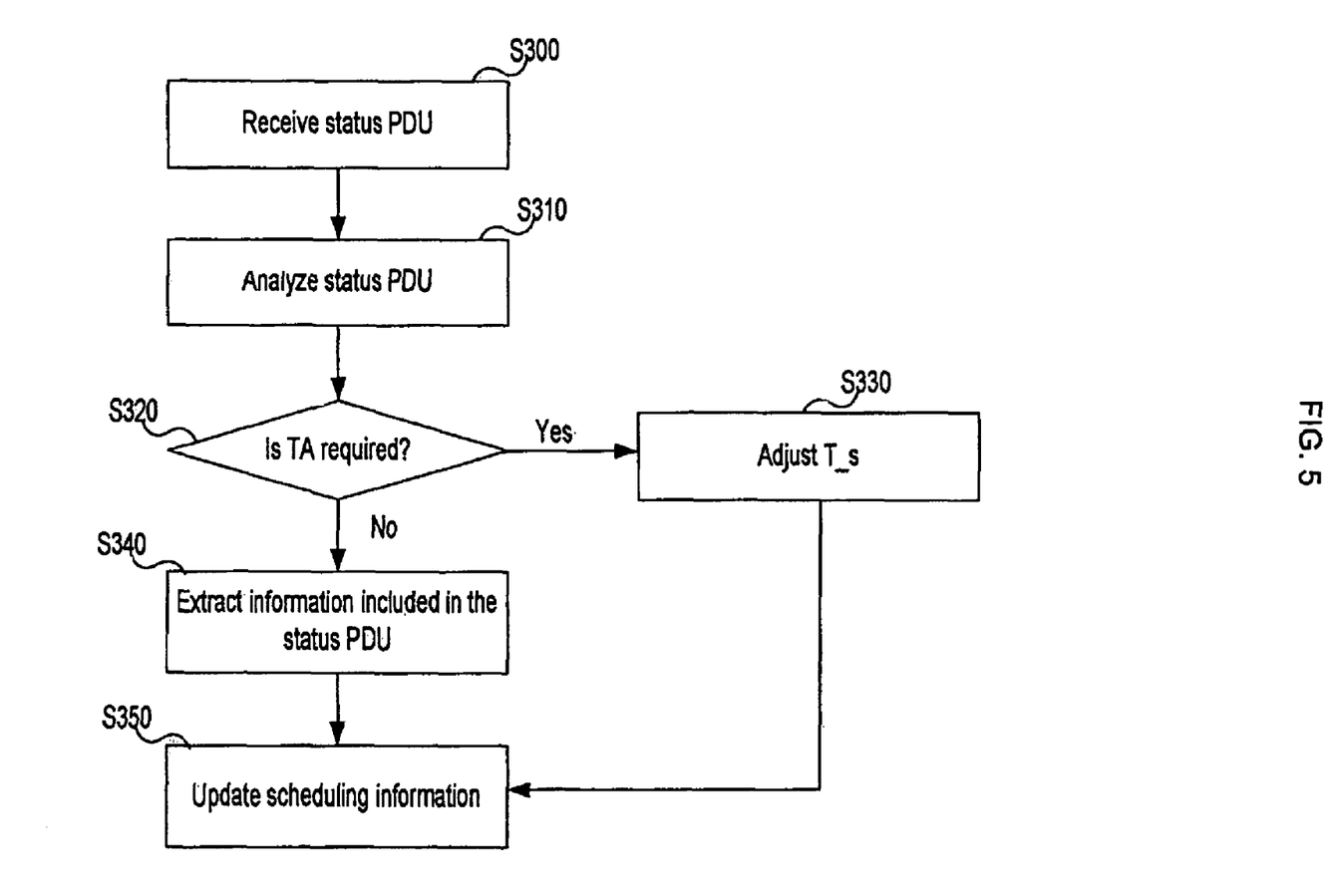
FIG. 5 is another operation flowchart of the base station according to the first exemplary embodiment of the present invention.

When receiving the status PDU from the UE 200, the base station 100 performs the corresponding process. FIG. 5 is a flowchart showing a process for processing a status PDU performed by the base station.

Information contained in the received status PDU is analyzed in steps S330 and S310. When the analysis result shows that the status PDU contains information on a change in a resource allocation start time, the base station 100 changes a resource allocation start time (T_s) for the next resource allocation to the start time contained in the status PDU, in steps S320 and S330.

However, when the information contained in the status PDU indicates no change in the resource allocation start time, scheduling information is updated in accordance with the information in the status PDU, in steps S340 and 350. Therefore, the next resource allocation is performed on the basis of the updated scheduling information.

In more detail, when the status PDU indicates the number of SDUs that have not been transmitted, the base station 100 may additionally allocate resources for a session of the corresponding UE in accordance with the number of additional SDUs even though the time interval T_a of the session has not yet expired. That is, the base station may perform additional resource allocation for the session even though time passed after the previous resource allocation is less than the time interval (T_a).

When the status PDU indicates additional BO for transmission of RTCP packets in addition to the additional SDUs, the base station 100 may perform additional resource allocation based on the additional BO even though a time interval (T_a) for a session of the corresponding UE 200 has not yet expired.

Since the time taken for a packet to enter a MAC from a generation source in the uplink may be ignored, jitter variation between packets is very low according to the PF scheduling method. Particularly, since the PF scheduling method targets traffic that periodically generates a fixed-size packet, a packet transmission interval can be maintained constant between wireless networks unless resource allocation is irregularly performed. As a result, a medium can be reproduced in the application with a predetermined efficiency since the time interval can be constantly maintained in terms of a final packet receiving application.

The PV scheduling method will now be described.

Figure 6:
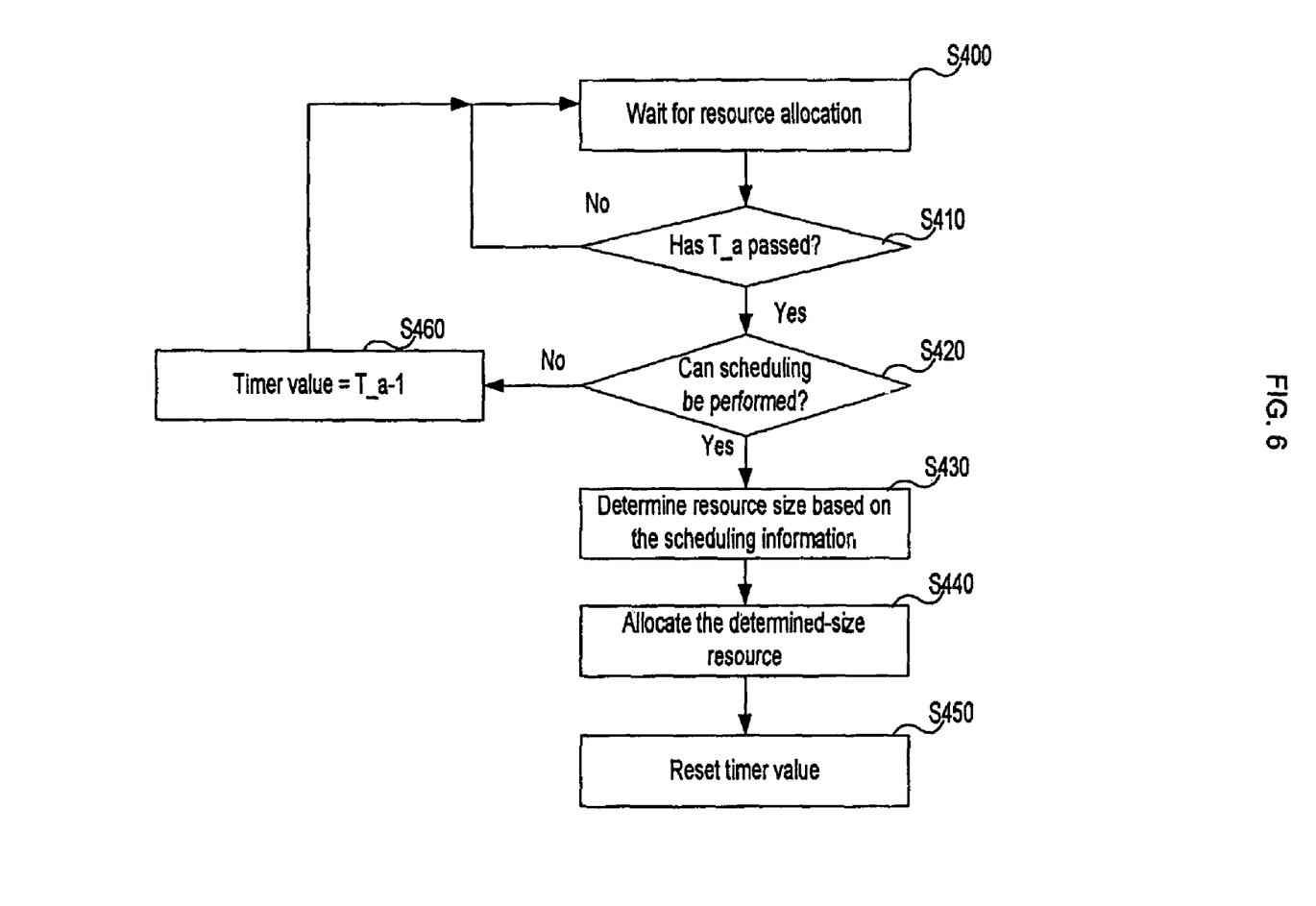
FIG. 6 is an operation flowchart of a base station according to a second exemplary embodiment of the present invention.
Figure 7:
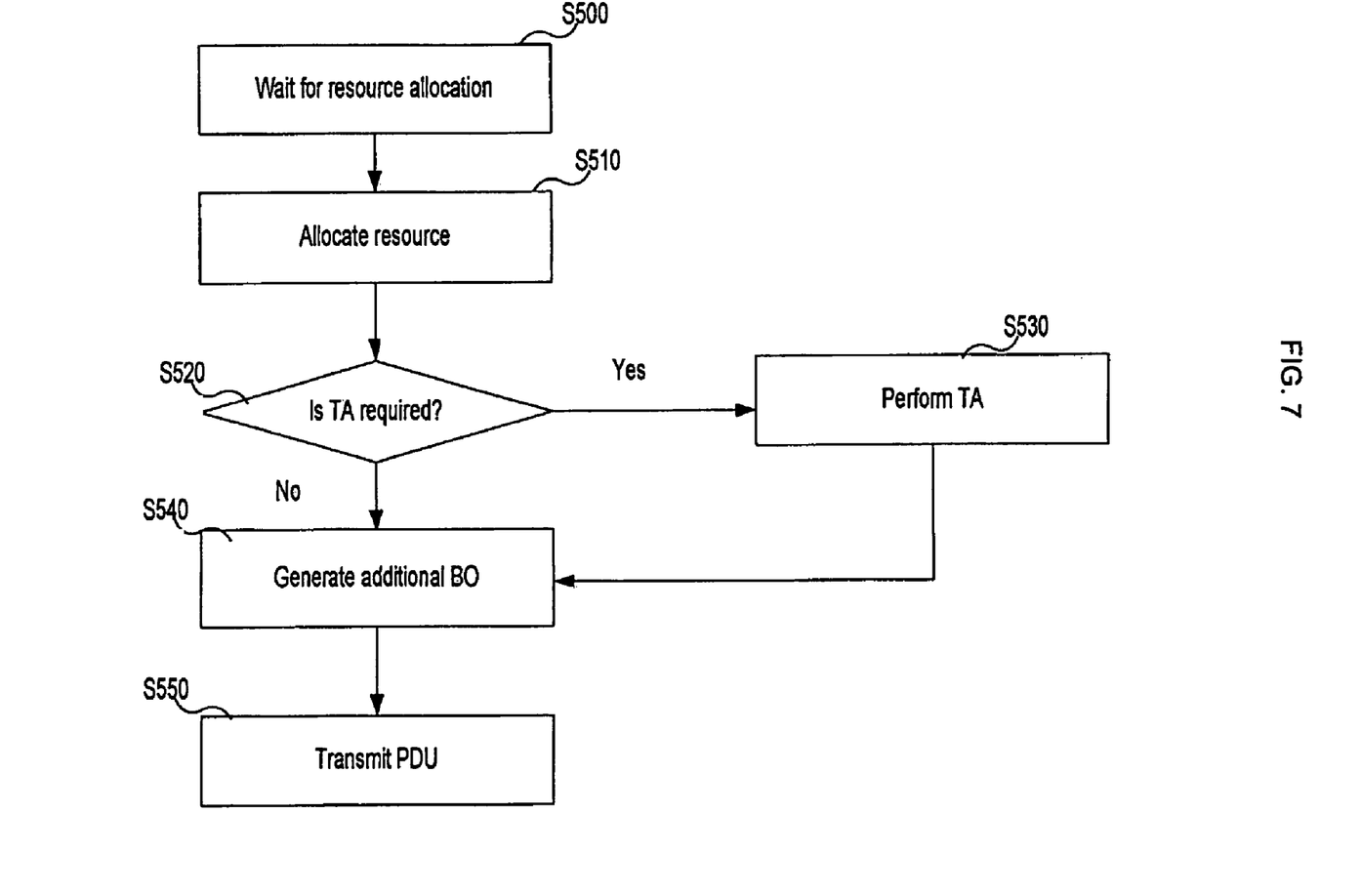
FIG. 7 is an operation flowchart of the UE according to the second exemplary embodiment of the present invention.

FIG. 6 and FIG. 7 are flowcharts of a PV scheduling method according to a second exemplary embodiment of the present invention. Particularly, FIG. 6 is an operation flowchart of a base station that performs PV scheduling, and FIG. 7 is an operation flowchart of UE that performs the PV scheduling.

According to the PV scheduling method, a variable-size (S_a) resource is allocated to UE in a periodic time interval (T_a). The time interval (T_a) is negotiated when a connection is established between the UE and the base station. Operation of the PV scheduling method is similar to that of the PF scheduling method.

Therefore, as shown in FIG. 6, the base station 100 sets a timer to T_a and allocates resources when a T_a timeout is triggered as in the process of FIG. 1, in steps S400 to S420. When performing only resource allocation, the size of the resource to be allocated is determined on the basis of scheduling information provided by the UE 200 rather than fixing the size to the negotiated size, and resource allocation is performed in accordance with the determined size, in step S430 and S440. Therefore, variable-size resource allocation is performed in accordance with a predetermined time interval. An initial amount of resource allocation after negotiation can be determined at the base station's disposal, and the amount of resource allocation after the amount of initial resource allocation can be determined on the basis of scheduling information provided by the UE. When the resource allocation is performed, the timer is reset as in the PF scheduling method, in step S450.

The UE 200 transmits a number of PDUs that can be transmitted through a currently allocated resource and transmits BO on the basis of the state of data remaining the transmit buffer to the base station 100 to help the base station 100 allocate a variable-size resource. In this case, the PDU and the BO are simultaneously rather than individually transmitted.

FIG. 7 is an operation flowchart of PV scheduling of UE.

As shown in FIG. 7, the UE 200 waits for resource allocation of the base station rather than requesting resource allocation from the base station 100. When the base station 100 allocates a predetermined-size resource after a predetermined time has passed through the process of FIG. 6 in steps S500 and S510, the UE 200 processes data (SDUs) queued in the transmit duffer to PDUs and transmits the PDUs to the base station 100 through the allocated resource.

In this case, the UE 200 performs TA to changes a resource allocation start time when it is necessary and generates BO that includes the changed resource allocation start time, in steps S520 and S530. In addition, when an additional BO report is required for additional SDUs and RTCP packet transmission, the corresponding BO is generated in step S540. In this case, unlike the resource request of the UE in the PF scheduling method, a total number of bytes of currently remaining SDUs in the buffer rather than the number of currently remaining SDUs is reported when the additional SDU is required. Particularly, information on the additional SDUs (i.e., the total number of bytes of currently remaining SDUs) and BO are processed to one BO and transmitted rather than individually transmitting the addition SDU information and the BO for the RTCP packet as in the PF scheduling method.

Accordingly, when TA is performed and thus BO that contains the TA is generated or additional BO is generated, the generated BO is simultaneously transmitted together with packet data (PDU) to the base station 100 in step S550. When receiving the PDU, the base station 100 changes a resource allocation start time in the case that the PDU includes TA and updates scheduling information for the corresponding UE based on information included in the PDU.

A PQ scheduling method will now be described.

According to the PQ scheduling method, the base station allocates an amount of resources to the UE, through which the UE can transmit predetermined information so as to periodically measure the amount of data quened to be transmitted in the UE. Herein, resource allocation of the base station to the UE for data transmission is called "transmission of a query to the UE" in the present embodiment. A time interval (T_q) for performing the query is set when a connection is established between the base station and the UE.

Figure 8:
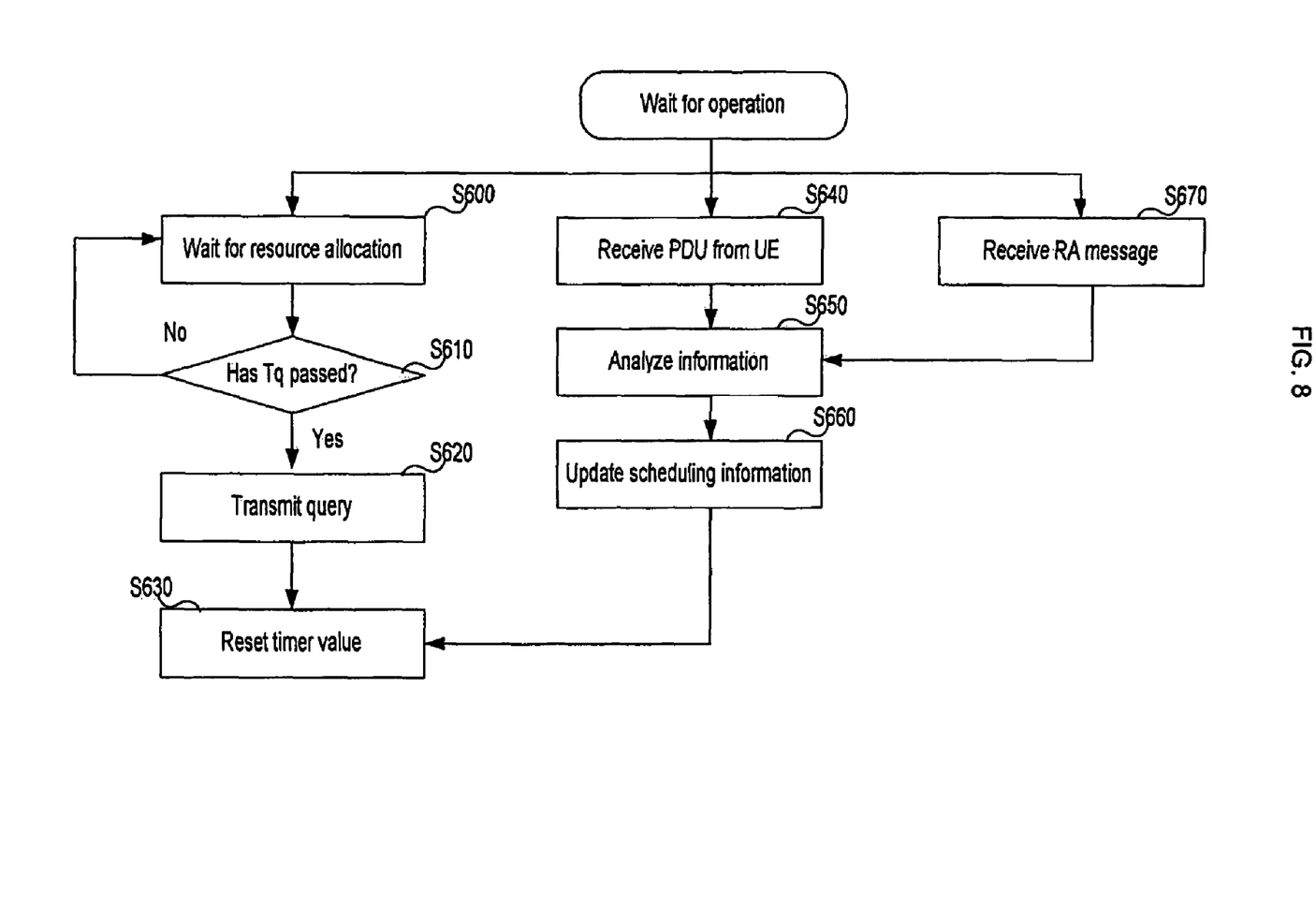
FIG. 8 is an operation flowchart of a base station according to a third exemplary embodiment of the present invention.
Figure 9:
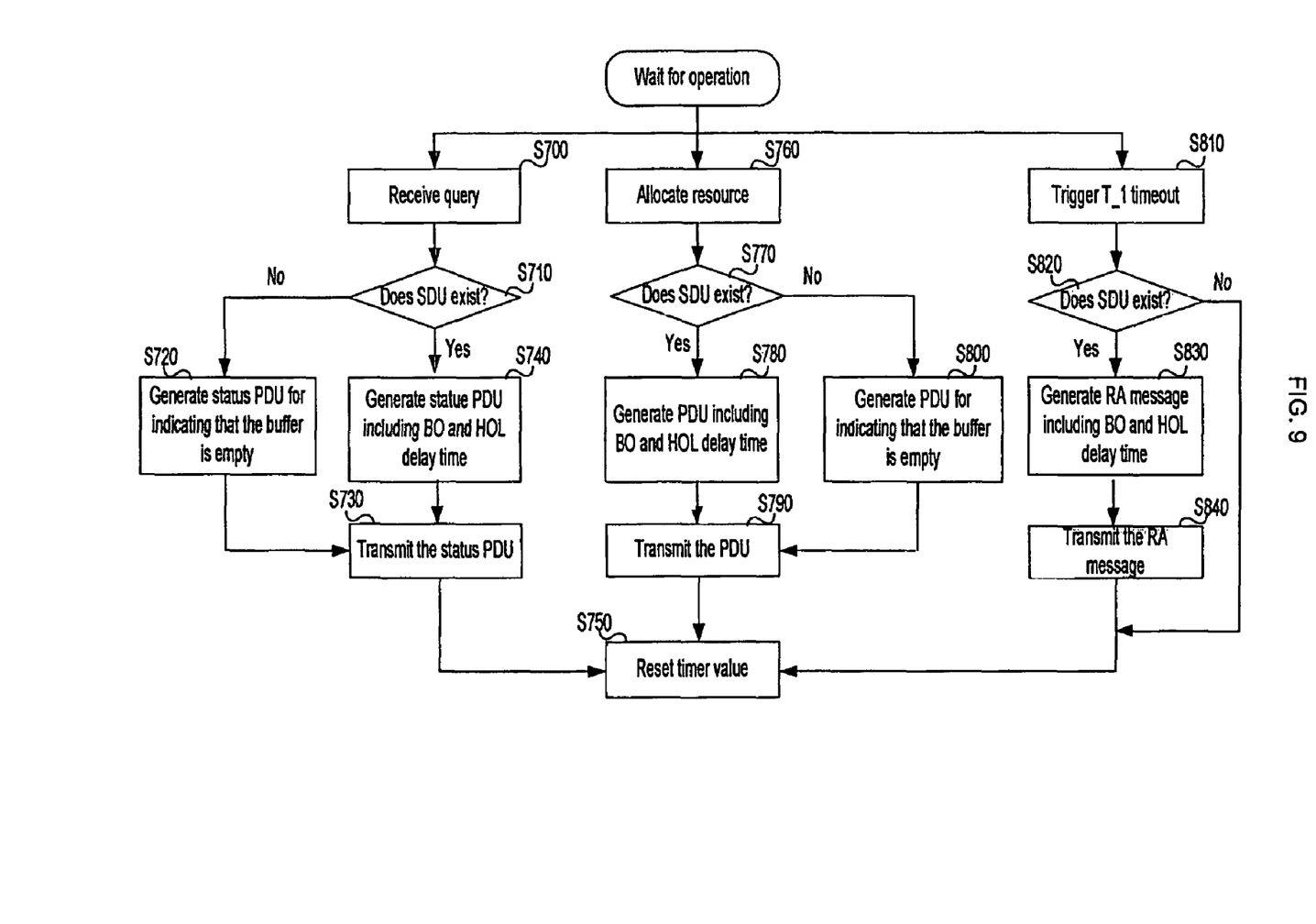
FIG. 9 is an operation flowchart of a UE according to the third exemplary embodiment of the present invention.

FIG. 8 and FIG. 9 respectively show a flowchart of a PQ scheduling process according to a third exemplary embodiment of the present invention, and particularly, FIG. 8 is an operation flowchart of PQ scheduling performed by a base station and FIG. 9 is a flowchart of PQ scheduling performed by UE.

A time interval (T_q) for a query is set in accordance with negotiation performed when a connection is established between UE and a base station, and the base station performs scheduling for a session with the corresponding UE as shown in FIG. 8.

When time that has been counted from the end of the negotiation passes a predetermined time interval (T_q) for the corresponding session, the base station 100 transmits the query to the UE 200. That is, after a timer value is set to the negotiated time interval (T_q), the timer value (T_q) is decremented as time passes in step S600. The timer value (T_q) is decremented by each slot or frame unit, and it is understood that a predetermined time has passed when the timer value (T_q) corresponds to zero, in steps S610 and S620. Herein, an event in which the timer value (T_q) corresponds to zero is called a "T_q timeout" for convenience of description. When the T_q timeout is triggered, the base station 100 transmits the query to the UE 200 in step S630. That is, the base station 100 allocates an amount of resources through which the UE 200 can transmit predetermined information. After transmitting the query, the base station 100 restores the timer value to T_q in step S640.

Subsequently, the UE 200 transmits the predetermined information by using the resources allocated through the transmission of the query. The information transmitted from the UE after receiving of the query is called "query response information" for convenience of description. The query response information is scheduling information, and, for example, the scheduling information contains BO and HOL delay time.

When the base station 100 receives a PDU that corresponds to the query response information from the UE 200 through the corresponding resource in step S640, the base station 100 updates scheduling information for a session with the UE 200 in steps S650 and S660.

However, the UE 200 may transmit information for a resource allocation request by using random access which is the fourth resource request method without regarding the query transmission from the base station 100. The information transmitted from the UE using the random access is called "an RA message" for convenience of description. The RA message may include BO and HOL delay time. In the case that the UE 200 transmits the RA message by using random access, the base station 100 updates scheduling information on the basis of information included in the RA message in step S670.

After transmitting the query, the base station 100 receives the query response information or the RA message from the UE 100 and updates the scheduling information. After that, the base station 100 resets the counted time, and transmits a query according to the time interval (T_q) while re-counting time.

Also, the base station 100 performs scheduling based on the scheduling information and allocates resources to the corresponding UE 200.

In the case that the PQ scheduling is performed by the base station in a manner like the above, the UE requests resources through the following operation.

FIG. 9 is an operation flowchart of the UE according to the third exemplary embodiment of the present invention.

After the negotiation, the UE 200 waits for a query from the base station 100 while counting time. When a query is received from the base station 100 when the waiting time has not passed the negotiated time interval (T_a), the UE 200 checks whether SDUs are queued in the transmit buffer in steps S700 and S710, and transmits query response information to the base station 100 depending on the existence of queued SDUs. In more detail, when no SDU is queued in the transmit buffer, the UE 200 generates a status PDU that contains information indicating that the transmit buffer is empty and transmits the status PDU to the base station 100, in steps S720 and S730. On the other hand, when the SDUs are queued in the transmit buffer, the UE 200 generates a status PDU that contains BO and HOL delay time of the current transmit buffer, and transmits the PDU to the base station 100, in step S740. Herein, the status PDU corresponds to the query response information.

The UE 200 resets the timer after responding to the query in step S750. Herein, the UE decrements the timer value (T_q) as time passes after resetting the timer value to the negotiated time interval (T_q). Subsequently, the UE transmits query response information in response to the query transmitted from the base station 100, and restores the timer value to T_q.

When the UE 200 responds to the query transmitted from the base station 100 and thus the base station 100 allocates resources, the UE 200 checks whether SDUs are queued in the transmit buffer after transmission of PDUs in step S760 and S770. That is, the base station 100 allocates the resources when there is data queued in the transmit buffer of the UE 200. However, other data may be queued in the transmit buffer, and there may be no data queued therein after data transmission. Therefore, it is determined whether other data is queued in the transmit buffer after transmission of current data, and information on a buffer state according to a result of the determination is transmitted together with the current data.

In more detail, it is checked whether SDUs are queued in the transmit buffer after transmission of the PDU (current data). When SDUs are queued in the transmit buffer, the buffer state information transmitted together with the PDU contains BO and HOL delay time, in steps S780 and S790. When there is no SDU queued in the transmit buffer, the buffer state information transmitted together with the PDU indicates that the transmit buffer is empty in step S800. In this case, the buffer state information can be transmitted by including an IE that contains the buffer state information in a PDU header or consecutively appending the status PDU having the IE to the PDU. As described, the base station 100 can be easily aware of the state of UE after transmission of the PDU since the UE transmits the buffer state information together with the PDU according to the second and third resource request methods. After data transmission, the UE 200 resets the counted time and starts time counting.

While waiting for the query from the base station 100, the UE 200 may check whether SDUs are queued in the transmit buffer when the base station 100 does not transmit the query even though the waiting time passes the negotiated time interval (T_q) and thus the T_q timeout is triggered, in steps S810 and S820. In the case that there are SDUs queued in the transmit buffer, the UE 200 transmits buffer state information that contains BO and HOL delay time to the base station 100 by using random access, in step S830 and S840.

When there is no SDU queued in the transmit buffer at the time that the T_q timeout event is triggered, the UE 200 resets the timer and waits for transmission of the query or resource allocation rather than transmitting the RA message.

A BE scheduling method will now be described.

Figure 10:
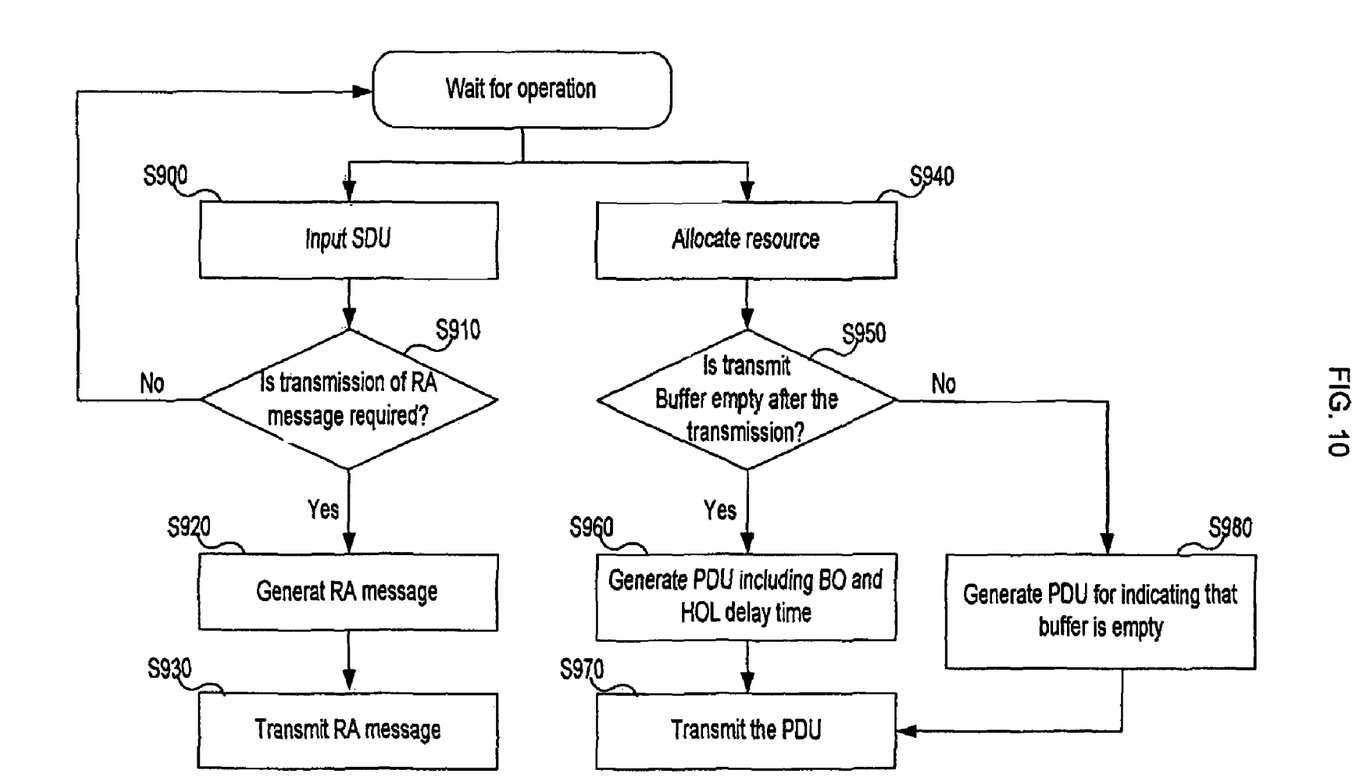
FIG. 10 is an operation flowchart of a UE according to a fourth exemplary embodiment of the present invention.

According to the BE method, a base station performs scheduling in accordance with a random access method of UE. FIG. 10 is a flowchart of a BE scheduling process according to a fourth exemplary embodiment of the present invention, and particularly it shows an operation flowchart of UE.

The UE 200 determines whether to perform random access when a new SDU is input to the transmit buffer, in steps S900 and S910. In general, since a buffer state is changed when an SDU is input to the transmit buffer, any changes in the transmit buffer state needs to be reported to the base station 100. Therefore, the UE 200 reports the buffer state to the base station 100 by using random access when the UE 200 determines that the buffer state has been changed due to the input of the new SDU. That is, the UE 200 generates an RA message that includes BO and HOL delay time and transmits the RA message to the base station 100, in steps S920 and S930.

Subsequently, the base station 100 allocates resources in step S940, and the UE 200 generates information on a buffer state after transmission of a current PDU as previously described in the third exemplary embodiment of the present invention, and transmits the information together with the next PDU to the base station 100. In more detail, when SDUs are queued in the transmit buffer after transmission of the current PDU, the UE 200 transmits buffer state information that includes BO and HOL delay time to the base station 100 together with the next PDU, in steps S950 to S970. When there is no SDU queued in the transmit buffer, the UE 200 transmits buffer state information indicating that the transmit buffer is empty, together with the next PDU, in step S980.

The base station 100 operates as follows.

When receiving the RA message transmitted by using random access from the UE 100, the base station 100 updates scheduling information based on information included in the RA message and performs resource allocation accordingly. In the case that the PDU transmitted from the UE 100 includes the buffer state information, the base station 100 updates the scheduling information based on the buffer state information and performs resource allocation accordingly.

In the above-described exemplary embodiments, the base station 100 updates scheduling information based on buffer state information provided by the UE 100 through the following process.

When the buffer state information indicates that the transmit buffer is empty, the HOL delay time and the BO included in the scheduling information for the corresponding UE are respectively set to "NULL" and "0". The HOL delay time is not updated because the transmit buffer is empty.

When the buffer state information provided by the UE 200 includes BO, BO included in the scheduling information of the UE 200 is updated with the BO included in the buffer state information. In this case, the transmit buffer has SDUs queued therein and therefore the HOL delay time is continuously updated.

When the UE 200 transmits not buffer station information but only a PDU, data occupancy that corresponds to the PDU is subtracted from the BO included in the scheduling information of the UE 200. In this case, the HOL delay time is updated.

When the buffer state information provided by the UE 200 includes the HOL delay time, HOL delay time included in the scheduling information of the UE is set to "NULL" and update of the HOL delay time is not performed.

On contrary, when the buffer state information provided by the UE 200 does not include the HOL delay time, the HOL delay time is continuously updated.

The packet scheduling and resource request methods according to the exemplary embodiment can be realized as a program and stored in a computer-readable recording medium (e.g. CD-ROM, RAM, ROM, floppy disk, hard disk, and optical disk).

Although this invention has been described in connection with what is presently considered to be practical exemplary embodiments, it is to be understood that the invention is not limited to the disclosed embodiments. For example, a time interval negotiated between the base station and the UE may be renegotiated by the base station and the UE during the corresponding session in the respective exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A packet scheduling method for uplink traffic transmission from user equipment (UE) to a base station in a mobile communication system, the packet scheduling method comprising:
    negotiating with the UE and setting information that includes a resource allocation start time, by the base station;
    determining whether the resource allocation start time that has been set during the negotiation has passed, by the base station; and
    when the resource allocation start time has passed, performing scheduling for the UE by using a scheduling method that is predetermined in accordance with a type of traffic characteristic of traffic to be transmitted on the basis of scheduling information from the UE, by the base station where the traffic is classified into a type generating a fixed-size packet in a periodic time interval, traffic that generates a variable-size packet in a periodic time interval, and traffic that generates a variable-size packet in a random time interval.

2. The packet scheduling method of claim 1, wherein when the predetermined scheduling method is a first scheduling method, the performing scheduling comprises allocating a fixed-size resource to the UE based on the scheduling information with a time interval negotiated with the UE from the resource allocation start time.

3. The packet scheduling method of claim 2, wherein scheduling information provided by the UE includes at least one of a resource allocation start time changed by the UE, the number of additional packet data to be transmitted in the UE, and buffer occupancy (BO) for packet data to be transmitted in the UE based on a real-time transmission control protocol.

4. The packet scheduling method of claim 1, wherein, when the predetermined scheduling method is a second scheduling method, c) comprises allocating a variable-size resource to the UE based on the scheduling information with a time interval negotiated with the UE from the resource allocation start time.

5. The packet scheduling method of claim 4, wherein the scheduling information provided by the UE includes at least one of a resource allocation start time changed by the UE, a total number of bytes of additional packet data to be transmitted in the UE, and buffer occupancy (BO) for packet data to be transmitted in the UE based on a real-time transmission control protocol.

6. The packet scheduling method of claim 5, wherein the UE generates scheduling information by processing the total number of bytes of the additional packet data and the BO to one BO and transmits the BO to the base station.

7. The packet scheduling method of claim 1, wherein, when the predetermined scheduling method is a third scheduling method,
    the performing scheduling comprises:
    transmitting a resource allocation query for a resource request to the UE with a time interval negotiated with the UE from the resource allocation start time;
    receiving query response information from the UE according to the transmission of the query;
    updating scheduling information of the UE based on the query response information; and
    performing scheduling for the UE based on the scheduling information.

8. The packet scheduling method of claim 1, wherein the performing of scheduling performs scheduling for the UE after a predetermined time interval has passed from the resource allocation start time when the resource allocation start time has passed.

9. The packet scheduling method of claim 1, wherein the traffic is classified into one of traffic periodically generating a fixed-size packet, traffic periodically generating a variable-size packet, and traffic generating a variable-size packet in a random time interval.

10. The packet scheduling method of claim 1, the packet scheduling method comprising transmitting the scheduling information to the base station according to one of first to fourth resource request methods, by the UE:
    the first resource request method including the scheduling information in a status PDU and transmitting the PDU to the base station;
    the second resource request method including the scheduling information in a PDU header and transmitting the PDU to the base station;
    the third resource request method consecutively appending the scheduling information to a PDU and transmitting the scheduling information and the PDU to the base station; and
    the fourth resource request method transmitting the scheduling information to the base station by random access.

11. The packet scheduling method of claim 1, wherein the packet scheduling method comprises determining a scheduling method in accordance with characteristics of traffic to be transmitted/received by the negotiation between the base station and the UE in the negotiating and the setting information.

12. A resource request method for user equipment (UE) to request resource allocation from a base station for uplink traffic transmission in a mobile communication system, the resource request method comprising:
- receiving a query for allocating a resource for a resource request from the base station, by the UE;
- determining a state of a transmit buffer in the UE according to the query;
- when the transmit buffer is empty, generating scheduling information indicating that the transmit buffer is empty;
- when there is packet data queued in the transmit buffer, generating scheduling information that includes a head of line (HOL) delay time of a first packet data in the transmit buffer and buffer occupancy (BO) of the transmit buffer; and
- requesting a resource by transmitting the generated scheduling information to the base station,
- wherein the uplink traffic generates a variable-size packet in a random time interval, and wherein the HOL delay time indicates a time interval between a first packet data input time and a current time, wherein the first packet data indicates packet data input to the transmit buffer for the first time among data packet queued in the transmit buffer.

13. The resource request method of claim 12, wherein, when a query is not transmitted from the base station after time negotiated with the base station has passed, the resource request method further comprises:
- determining a state of the transmit buffer; and
- when there is packet data queued in the transmit buffer, generating scheduling information that includes head of line (HOL) delay time of a first packet data in the transmit buffer and buffer occupancy (BO) of the transmit buffer, and transmitting the scheduling information to the base station.

* * * * *